United States Patent Office

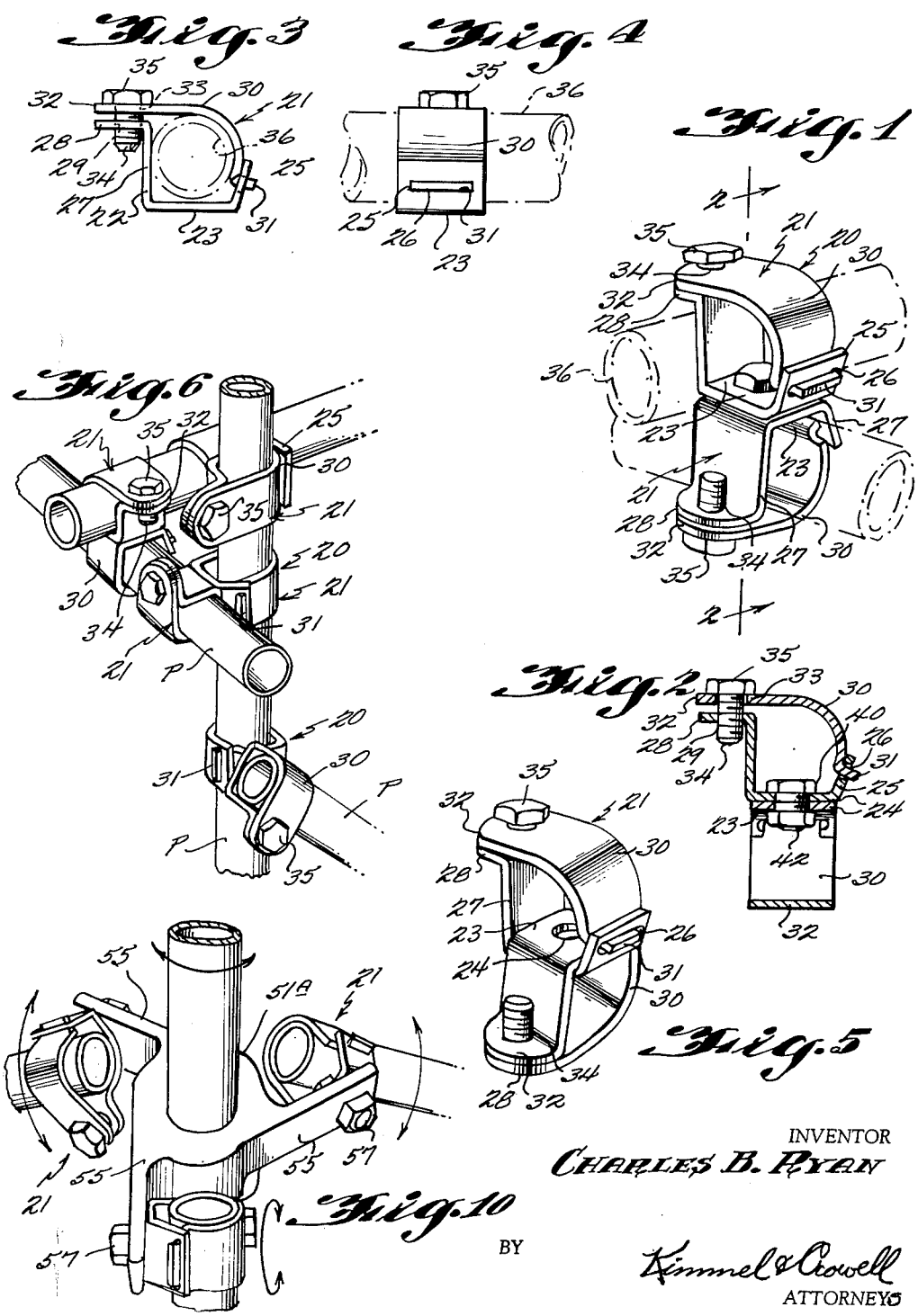

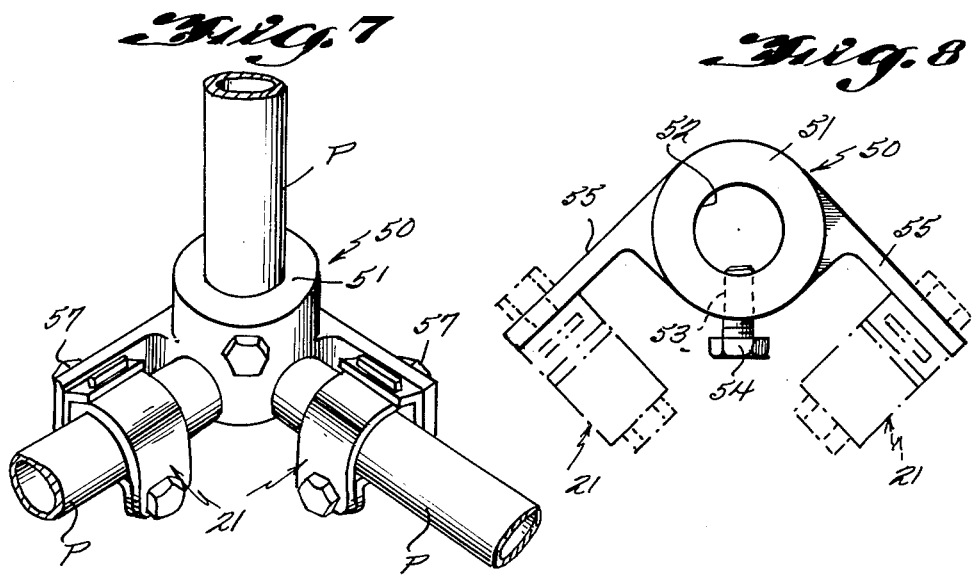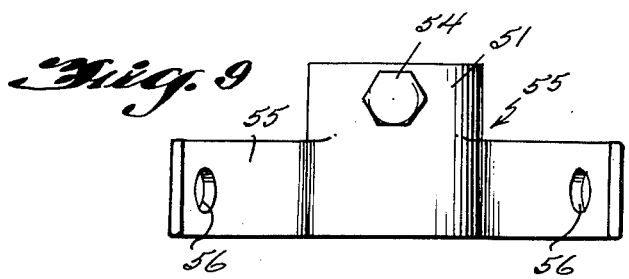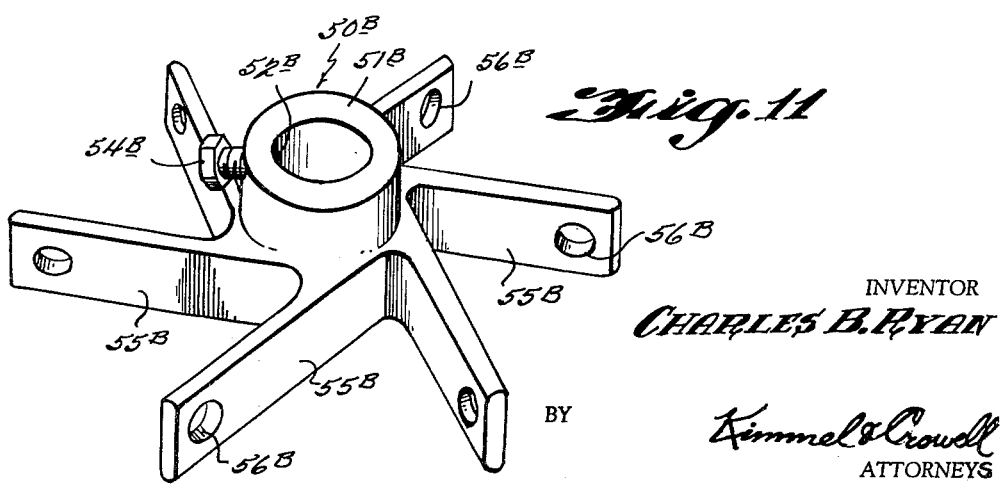

3,007,727
Patented Nov. 7, 1961

3,007,727
STRUCTURAL COUPLING ASSEMBLY
Charles B. Ryan, Box 371, Rte. 2, Creswell, Oreg.
Filed Dec. 15, 1959, Ser. No. 859,709
1 Claim. (Cl. 287—54)

This invention relates to a structural coupling assembly and has particular applicability to such an assembly adapted for the construction of temporary or supporting frameworks, as, for example, light commercial displays or artwork, for photographers' scaffolding, for the framework of temporary booths such as employed at fairs or exhibitions, and in related fields.

The invention may also be employed as an educational aid in certain fields of science, architecture, and structural enginering, and has further applicability to a large scale building toy.

A primary object of the invention is the provision of means for securing together units of limited directional capability in such manner that the structural members may be grouped and secured together in substantially all the directions of a sphere.

An additional object of the invention is the provision of a coupling assembly which is sturdy and durable in construction, reliable and efficient in operation, relatively simple and inexpensive to manufacture and utilize, and which has extreme versatility in varied structural relations.

A further object of the invention is the provision of such a structural assembly which comprises a special coupling, which is readily disassembled into half-couplings, multi-armed connecting brackets, and straight or curved rods, tubes or pipes adapted to be interconnected in varied relation by the couplings, half-couplings, and brackets.

Other objects of the invention reside in the combinations of elements, arrangements of parts, and features of construction, all as will be more fully pointed out hereinafter, and disclosed in the accompanying drawings wherein there are shown preferred embodiments of this inventive concept.

In the drawings:

FIGURE 1 is a perspective view of a complete coupling shown as attaching two pipe sections in related assembly in angular relation, the pipe couplings being indicated in dotted lines;

FIGURE 2 is a sectional view taken substantially along the line 2—2 of FIGURE 1, as viewed in the direction indicated by the arrows;

FIGURE 3 is an end elevational view of a half-coupling section shown in association with a pipe, the latter being shown in dotted lines;

FIGURE 4 is a side elevational view of the construction of FIGURE 3;

FIGURE 5 is a perspective view of a complete coupling showing the elements thereof secured together by interlocking, in fixed right angular relation, rather than in a rotatable relation of the device of FIGURE 1;

FIGURE 6 is a perspective view showing a number of couplings connecting a number of pipes in angular related assembly, showing one arrangement made possible by the use of the couplings of the instant invention;

FIGURE 7 is a perspective view showing a bracket associated with two half-couplings for connecting three pipes in angular relation;

FIGURE 8 is a top plan view of the bracket of FIGURE 7;

FIGURE 9 is an end elevational view of the bracket shown in FIGURES 7 and 8;

FIGURE 10 is a perspective view showing another form of multi-armed bracket shown in association with a plurality of pipes connected in angular relation; and FIGURE 11 is a perspective view of a modified form of bracket showing multiple arms.

Similar reference characters refer to similar parts throughout the several views of the drawings.

Having reference now to the drawings in detail, and more particularly to FIGURES 1 to 4 inclusive, there is generally indicated at 20 a coupling unit constructed in accordance with the instant invention, which is comprised of two half-units, each generally indicated at 21, the two half-units being substantially identical. As best shown in FIGURES 3 and 4, each half-unit 21 is comprised of a substantially U-shaped member 22 including a bight 23 having an opening 24 therein (see FIG. 2). One leg of U-shaped member 22 extends upwardly at a slight angle, as indicated at 25, and is provided with a transverse elongated slot 26. The other leg 27 of U-shaped member 22 has at its upper extremity a laterally extending flange 28, which is provided with a threaded opening 29 therein. The other portion of the unit comprises an arcuate sheet member 30, which has at one end a protruding tongue 31, which is adapted to engage in slot 26. Member 30 also has an extending end portion 32 which is adapted to overlie flange 28, and which has extending therethrough an unthreaded bore or aperture 33. A bolt 34 having a head 35 is extended through the opening 33, and threadedly engages in the threaded opening 29. By virtue of this arrangement, an individual pipe section 36 may be clampingly engaged by each individual clamp member 21, as best shown in FIGURES 3 and 4.

As best shown in FIGURES 1 and 2, the complete coupling is assembled by means of a bolt 40 which is extended through two aligned openings 24 in bights 23 of opposed half-units. The bolt 40 includes a head 41, and is provided with a nut 42, the arrangement being such that when the nut is loosened the two half-connector members may be rotated to any desired angle relative to each other, and when the nut 42 is tightened they are held in such angular relation. Obviously, loosening the bolts 34 will permit partial disengagement of the connector members to permit the insertion of pipes P therein.

FIGURE 5 discloses the two half-clip sections 21 connected together so that they are associated at right angles to each other without the adjustable feature. This is effected by interengaging the bight portions 23 of the two units at right angles to each other, so that no relative movement therebetween is permitted. When in this position two pipes may be clampingly engaged at right angles to each other.

FIGURE 6 discloses an arrangement wherein four coupling units 20 are employed for the purpose of connecting a plurality of pipe sections P in the form of a corner section, for example, with an additional member extending in angular relation to the first three interconnected pipes.

This is merely illustrative of the relatively wide variety of connections and combinations which may be effected by the use of the coupling elements 20 in various arrangements and combinations.

FIGURES 7, 8 and 9 disclose one form of multi-arm bracket which may be employed in connection with a plurality of pipe sections P and a plurality of half-sections 21 of the coupling unit. In this construction, the bracket, generally indicated at 50, includes a hub portion 51, which is provided with a central bore 52 for the accommodation of one section of pipe or tube P. The hub portion is provided with a threaded opening 53 in which is positioned a set screw 54 for clamping the hub section to the centrally disposed pipe P. Arms 55 extend outwardly from the hub 51 at right angles, and are provided at their extremities with bores 56, through which may be passed suitable bolts 57, which in turn extend through the openings in the bights of the U-shaped members 22 of a pair of half-clamps 21, the arrangement, as shown in FIGURES 7 and 8, being such that two additional pipes P may be disposed at right angles relative to each other, and in perpendicular relation to the first pipe P fitted in the bore 52.

A modified form of bracket is shown in FIGURE 10, and includes a hub 51A, having three arms 55 extended therefrom at suitable angles, to which half-connectors 21 are secured by bolts 57A in a manner identical to that previously described. Additional pipe sections P may be engaged by each of the half-clamps or connectors, and positioned at any desired angular inclination within the range indicated by the arrows in FIGURE 10.

Brackets may be constructed with any desired number of arms, in accordance with the particular structure to be constructed therewith.

Four, five and six arm brackets, the latter being shown in FIGURE 11, are within the contemplation of the instant invention, and even more arms may be applied if desired. In FIGURE 11 there is indicated a six arm bracket assembly at 50B. This assembly includes a hub 51B having a central bore 52B and a set screw 54B extending through a suitable threaded aperture in the hub. In this modification, six arms 55B are provided, each being provided, in turn, with an aperture 56B by means of which a half-connector 21, a full connector 22 or an additional bracket may be secured to any one of the arms.

It will thus be seen that a virtually infinite variety of shapes and arrangements of pipes or tubing may be constructed by the use of the couplings, half-couplings, and connectors of the instant invention.

As many embodiments may be made of this inventive concept, and as many modifications may be made in the embodiments hereinbefore shown and described, it is to be understood that all matter herein is to be interpreted merely as illustrative, and not in a limiting sense.

I claim:

A structural coupling assembly adapted for the connection of a plurality of elongated elements in a selected angular relation, comprising a plurality of couplings, each including a substantially U-shaped member having an opening in its bight and a transverse slot in one leg thereof, and a flange extending transversely from the end of the other leg, said flange having a threaded opening therein, and a second member comprising an arcuate plate-like member having a lug at one end engageable with said transverse slot and an extending end having an aperture therein overlying said flange, said apertures being aligned, a clamping bolt engaging said threaded aperture through said aperture in said extending end, and a mounting bracket including an apertured hub adapted for the reception of a pipe, set screw means in said hub adapted to engage said pipe, and a plurality of substantially rectangular-shaped arms extending radially from said hub, each arm having an opening therein, and screw means extending through each said opening and the opening in the bight of an associated U-shaped member for securing a coupling to each arm in a selected position of angular adjustment.

References Cited in the file of this patent

UNITED STATES PATENTS

| 566,552 | Weidman | Aug. 25, 1896 |
| 879,940 | Blood | Feb. 25, 1908 |
| 1,099,018 | Callahan | June 2, 1914 |
| 2,511,035 | Barton | June 13, 1950 |

FOREIGN PATENTS

| 64,328 | France | June 1, 1955 |
| 806,815 | France | Oct. 5, 1936 |